(12) United States Patent
Lee et al.

(10) Patent No.: US 8,158,036 B2
(45) Date of Patent: *Apr. 17, 2012

(54) PHOTOSENSITIVE RESIN COMPOSITION FOR COLOR FILTER AND COLOR FILTER USING SAME

(75) Inventors: Chang-Min Lee, Goyang-si (KR);
Kil-Sung Lee, Gwacheon-si (KR);
Jae-Hyun Kim, Seongnam-si (KR);
Eui-June Jeong, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 60 days.

This patent is subject to a terminal disclaimer.

(21) Appl. No.: 12/325,330

(22) Filed: Dec. 1, 2008

(65) Prior Publication Data

US 2009/0140220 A1 Jun. 4, 2009

(30) Foreign Application Priority Data

Nov. 30, 2007 (KR) .................. 10-2007-0124023

(51) Int. Cl.
*G02B 5/23* (2006.01)
*G02F 1/1335* (2006.01)

(52) U.S. Cl. .......... 252/586; 106/31.28; 349/106; 359/885; 430/7; 430/517; 548/453

(58) Field of Classification Search .......... 252/586; 106/31.28; 548/453; 359/885; 430/7, 517; 349/106

See application file for complete search history.

(56) References Cited

U.S. PATENT DOCUMENTS

| | | | |
|---|---|---|---|
| 5,362,597 A | 11/1994 | Sano et al. | |
| 5,362,697 A | 11/1994 | Fung et al. | |
| 5,399,604 A | 3/1995 | Sano et al. | |
| 5,631,703 A | 5/1997 | Hamilton, Jr. et al. | |
| 5,840,907 A | 11/1998 | Hendi | |
| 5,854,091 A | 12/1998 | Baek et al. | |
| 6,160,037 A | 12/2000 | Leugs et al. | |
| 7,431,762 B2 | 10/2008 | Minashima et al. | |
| 2004/0050294 A1 | 3/2004 | Yoshihara et al. | |
| 2005/0255391 A1* | 11/2005 | Adam et al. | 430/7 |
| 2006/0280878 A1 | 12/2006 | Suezaki et al. | |
| 2007/0210395 A1 | 9/2007 | Maruyama et al. | |
| 2008/0108831 A1 | 5/2008 | Adam et al. | |
| 2009/0140220 A1 | 6/2009 | Lee et al. | |
| 2009/0146236 A1* | 6/2009 | Lee et al. | 257/432 |
| 2009/0208854 A1 | 8/2009 | Choi et al. | |

FOREIGN PATENT DOCUMENTS

| | | |
|---|---|---|
| EP | 1063247 A1 | 12/2000 |
| JP | 7-172032 | 7/1995 |
| JP | 7-235655 | 9/1995 |
| JP | 10-066094 | 3/1998 |
| JP | 11-092695 | 4/1999 |
| JP | 11-354763 | 12/1999 |
| JP | 13154206 A | 6/2001 |
| JP | 2002-072465 | 3/2002 |
| JP | 15107703 A | 4/2003 |
| JP | 2004-341121 | 12/2004 |
| JP | 17062620 A | 3/2005 |
| JP | 2005-278213 | 10/2005 |
| JP | 2008-024873 | 2/2008 |
| KR | 1998-056215 B1 | 5/1999 |
| KR | 10-1999-0072717 A | 9/1999 |
| KR | 10-1998-0002050 B1 | 6/2000 |
| KR | 10-0255656 B1 | 6/2000 |
| KR | 10-0268697 B1 | 7/2000 |
| KR | 2002-039125 A | 5/2002 |
| KR | 2003-002899 A | 1/2003 |
| KR | 10-2003-0057103 A | 7/2003 |
| KR | 2003-056596 A | 7/2003 |
| KR | 1020030075890 A | 9/2003 |
| KR | 10-2005-0070619 A | 7/2005 |
| KR | 1020050077345 A | 8/2005 |
| KR | 2006-0052171 A | 5/2006 |
| KR | 1020070007016 A | 1/2007 |
| KR | 1020070021966 A | 2/2007 |
| KR | 2007-0033748 A | 3/2007 |
| KR | 100793946 B1 | 1/2008 |
| KR | 10-2009-0056736 A | 6/2009 |
| WO | WO00/40632 * | 7/2000 |
| WO | 2004/009710 A1 | 1/2004 |
| WO | 2005076060 A | 8/2005 |
| WO | 2008/060011 A1 | 5/2008 |

OTHER PUBLICATIONS

International Search Report in commonly owned International Application No. PCT/KR2006/005556 mailed on Jul. 6, 2007. Office Action in commonly owned U.S. Appl. No. 12/329,650, mailed on Apr. 6, 2010.

* cited by examiner

*Primary Examiner* — Ling Choi
*Assistant Examiner* — Bijan Ahvazi
(74) *Attorney, Agent, or Firm* — Summa, Additon & Ashe, P.A.

(57) ABSTRACT

The photosensitive resin composition for a color filter according to one embodiment of the present invention includes (A) a pigment including a repeating unit of the following Formula 1, (B) a binder resin, (C) a photopolymerization initiator, (D) a photopolymerizable monomer, and (E) a solvent:

[Chemical Formula 1]

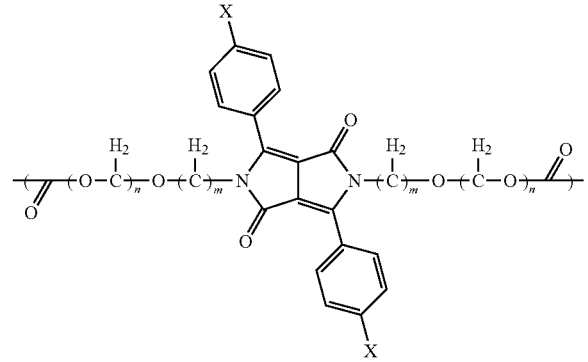

wherein in the above formula, X, m, and n are the same as in the description.

7 Claims, 3 Drawing Sheets

PHOTOSENSITIVE RESIN COMPOSITION FOR COLOR FILTER AND COLOR FILTER USING SAME

CROSS-REFERENCE TO RELATED APPLICATION

This application claims priority to and the benefit of Korean Patent Application No. 10-2007-0124023 filed in the Korean Intellectual Property Office on Nov. 30, 2007, the entire disclosure of which is incorporated herein by reference.

FIELD OF THE INVENTION

The present invention relates to a photosensitive resin composition for a color filter and a color filter using the same.

BACKGROUND OF THE INVENTION

An image sensor is a part for photographing images in a device such as a portable phone camera or a digital still camera (DSC). An image sensor can be classified as a charge-coupled device (CCD) image sensor or a complementary metal oxide semiconductor (CMOS) image sensor, depending on the manufacturing process and the method of using the same.

A color photographing part for a charge-coupled device (CCD) image sensor or a complementary metal oxide semiconductor (CMOS) image sensor includes color filters, each having additive mixing primary color filter segments of red, green, and blue, and the colors are separated.

A recent color filter embodied in the color photographing part has a pattern size of 2 μm or less, which is $1/100^{th}$ to $1/200^{th}$ of the pattern size of a conventional color filter pattern for LCDs. Accordingly, increased resolution and decreased pattern residues are important factors for determining the performance of a device.

It is believed that the kind and composition ratio of a photoinitiator, a monomer, and a binder and the pigment dispersion solution determine whether the resolution is increased and the pattern residues are decreased. Furthermore, in order to provide a fine pattern, the pigment dispersion solution should be prepared to have a small particle diameter and a composition that does not leave pattern residues when developing an image. In order to decrease the dispersing particle diameter of the pigment dispersion solution, the pigment should have a small primary particle diameter, and the kind and amount of a dispersing agent should be considered.

Recently, a photosensitive resin composition including a dye capable of dissolving in an organic solvent has been developed in order to overcome the limitations of pigments. Such a dye which is capable of dissolving in an organic solvent can reduce residues and improve resolution and provide higher luminance and color contrast than a color photosensitive resin composition for a display color filter. However, conventional dyes have limitations, such as poor heat- and light-resistance.

SUMMARY OF THE INVENTION

One embodiment of the present invention provides a photosensitive resin composition for a color filter that includes a pigment that is capable of dissolving in an organic solvent in order to improve pattern resolution and reduce residue.

Another embodiment of the present invention provides a color filter using the photosensitive resin composition for a color filter.

The embodiments of the present invention are not limited to the above technical purposes, and a person of ordinary skill in the art can understand other technical purposes.

According to one embodiment of the present invention, a photosensitive resin composition for a color filter is provided that includes (A) a pigment including a repeating unit of the following Formula 1, (B) a binder resin, (C) a photopolymerization initiator, (D) a photopolymerizable monomer, and (E) a solvent.

[Chemical Formula 1]

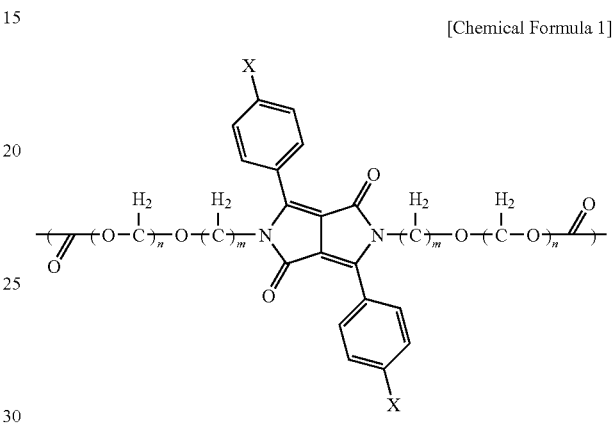

In the above formula, each X is independently halogen; substituted or unsubstituted alkyl; substituted or unsubstituted alkenyl; substituted or unsubstituted alkynyl; substituted or unsubstituted aryl; substituted or unsubstituted heteroaryl; substituted or unsubstituted arylalkyl; substituted or unsubstituted cycloalkyl; substituted or unsubstituted heterocycloalkyl; substituted or unsubstituted cycloalkenyl; substituted or unsubstituted cycloalkynyl; substituted or unsubstituted alkoxy; substituted or unsubstituted alkyl amino; substituted or unsubstituted alkoxy amino; or substituted or unsubstituted alkanol, each m is independently an integer ranging from 1 to 20, and each n is independently an integer ranging from 0 to 20.

The pigment including a repeating unit of the above Formula 1 can have a weight average molecular weight of about 2000 to about 40,000.

According to another embodiment of the present invention, a color filter including the photosensitive resin composition for a color filter is provided.

Further embodiments of the present invention will also be described in detail.

The photosensitive resin composition for a color filter can have improved heat- and light-resistance and can provide a high-resolution fine pattern during exposure and development. It also can substantially reduce residues. Therefore, the photosensitive resin composition for a color filter can provide color filters having improved sensitivity and pixel useful in CMOS or CCD image sensors or LCD display devices.

DETAILED DESCRIPTION OF THE INVENTION

Figure 1:
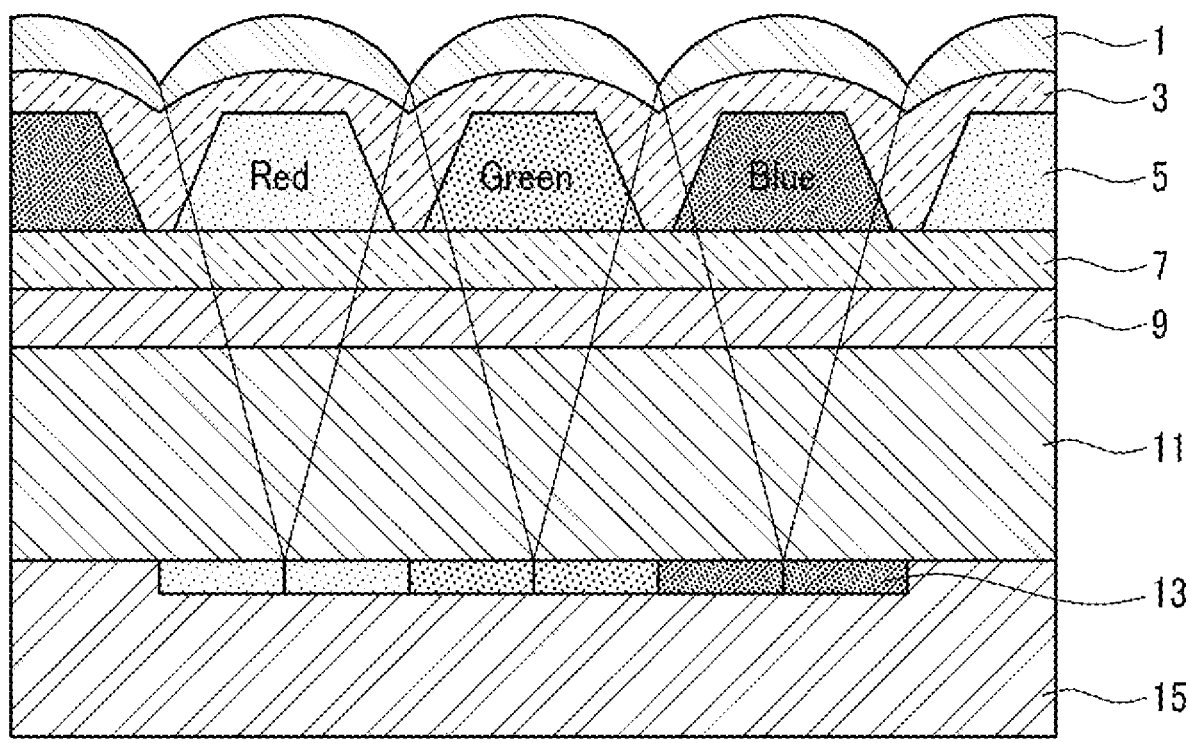
FIG. 1 is a schematic view of a complementary metal oxide semiconductor (CMOS) image sensor according to one embodiment of the present invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements. Like numbers refer to like elements throughout the specification.

In the present application, the following reference numerals indicate the following elements in the drawings: 1: microlens; 3: second overcoating layer; 5: color filter; 7: first overcoating layer; 9: passivation layer; 11: inter-metal dielectric or insulation layer; 13: photodiode; 15: interlayer insulating layer; and 100: image sensor.

The terminology used herein is for the purpose of describing particular embodiments only and is not intended to be limiting of the invention. It will be understood that when an element such as a layer, region or substrate is referred to as being "on" another element, it can be directly on the other element or intervening elements may also be present. In contrast, when an element is referred to as being "directly on" another element, there are no intervening elements present.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. Thus, the regions illustrated in the figures are schematic in nature and their shapes are not intended to illustrate the precise shape of a region of a device and are not intended to limit the scope of the present invention.

As used herein, when a specific definition is not otherwise provided, the term "an alkyl" refers to a C1-C30 alkyl, the term "an alkenyl" refers to a C2-C16 alkenyl, the term "an alkynyl" refers to a C3-C30 alkynyl, the term "an aryl" refers to a C6-C30 aryl, the term "a heteroaryl" refers to a C2-C30 heteroaryl, the term "an arylalkyl" refers to a C6-C30 arylalkyl, the term "a cycloalkyl" refers to a C5-C20 cycloalkyl, the term "a heterocycloalkyl" refers to a C2-C30 heterocycloalkyl, the term "a cycloalkenyl" refers to a C5-C30 cycloalkenyl, the term "a cycloalkynyl" refers to a C5-C20 cycloalkynyl, the term "an alkoxy" refers to a C1-C30 alkoxy, and the term "an alkanol" refers to a C1-C30 alkanol. The terms alkyl amino or alkoxy amino refer to amino wherein hydrogen is partially substituted with an alkyl or alkoxy that is the same as defined above.

As used herein, when a specific definition is not otherwise provided, the term "substituted" refers to one substituted with at least one or more substituents including halogen (F, Br, Cl, or I), hydroxy, nitro, cyano, amino (—$NH_2$, —NH(R), or —N(R')(R''), where R, R', and R'' are each independently C1 to C10 alkyl), amidino, hydrazine, or hydrazone, carboxyl, substituted or unsubstituted alkyl, substituted or unsubstituted aryl, substituted or unsubstituted cycloalkyl, substituted or unsubstituted heteroaryl, or substituted or unsubstituted heterocycloalkyl. The terms "heteroaryl" or "heterocycloalkyl" refer to aryl or cycloalkyl including 1 to 20, for example 1 to 15, and as another example 1 to 5 heteroatoms including one or more of N, O, S, or Si or a combination thereof.

The photosensitive resin composition for a color filter according to one embodiment includes (A) a pigment including a repeating unit of the following Formula 1, (B) a binder resin, (C) a photopolymerization initiator, (D) a photopolymerizable monomer, and (C) a solvent.

Hereinafter, the components of the photosensitive resin composition for a color filter according to one embodiment of the present invention are illustrated in detail.

(A) Pigment

The pigment is a polymer obtained from polymerization of a modified monomer of the following Formula 2. The polymer is modified from a generally-used red diketopyrrolopyrrole-based pigment compound. The monomer of the following Formula 2 dissolves in an organic solvent to decrease residue and improve resolution as well as heat- and light-resistance.

[Chemical Formula 2]

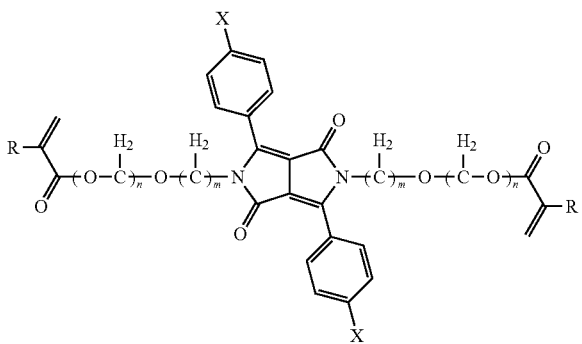

In the above formula, each X is independently halogen; substituted or unsubstituted alkyl; substituted or unsubstituted alkenyl; substituted or unsubstituted alkynyl; substituted or unsubstituted aryl; substituted or unsubstituted heteroaryl; substituted or unsubstituted arylalkyl; substituted or unsubstituted cycloalkyl; substituted or unsubstituted heterocycloalkyl; substituted or unsubstituted cycloalkenyl; substituted or unsubstituted cycloalkynyl; substituted or unsubstituted alkoxy; substituted or unsubstituted alkyl amino; substituted or unsubstituted alkoxy amino; or substituted or unsubstituted alkanol, each R is independently H or alkyl, each m is independently an integer ranging from 1 to 20, and each n is independently an integer ranging from 0 to 20.

The polymer used as a pigment can have a weight average molecular weight of about 2000 to about 40,000. The polymer is a homopolymer obtained from a monomer of the above Formula 2 or a copolymer obtained from polymerization of a monomer of the above Formula 2 and another monomer.

The pigment may be a copolymer that is obtained by the following process: a red diketopyrrolopyrrol pigment or a derivative thereof such as C. I. Pigment Red 254, 255, 264, 270, 272, and the like is acrylated to obtain a monomer capable of being dissolved in an organic solvent, and the resulting monomer is subject to radical polymerization with an acrylate-based compound to obtain a polymeric pigment capable of being dissolved in an organic solvent. The acrylate-based compound can include generally-used monomers such as but not limited to methacrylic acid, benzyl methacrylate, and the like, and combinations thereof, in a photosensitive resin composition. Specific examples of acrylate-based compounds useful in the invention include without limitation alkenyl aromatic compounds such as styrene, α-methyl styrene; vinyltoluene, and vinyl benzyl methyl ether; unsaturated carboxylic acid compounds such as acrylic acid and methacrylic acid; unsaturated carbonic acid ester series compounds such as methyl acrylate, methyl methacrylate, ethyl acrylate, ethyl methacrylate, butyl acrylate, butyl methacrylate, 2-hydroxy ethyl acrylate, 2-hydroxy ethyl methacrylate, 2-hydroxy butyl acrylate, 2-hydroxy butyl methacrylate, benzyl acrylate, benzyl methacrylate, cyclohexyl acrylate, cyclohexyl methacrylate, phenyl acrylate, phenyl methacrylate, and the like; unsaturated carbonic acid aminoalkyl ester series compounds such as 2-amino ethyl acrylate, 2-amino ethyl methacrylate, 2-dimethyl amino ethyl acrylate, 2-dimethyl amino ethyl methacrylate, and the like; carbonic acid vinyl ester series compounds such as vinyl acetate, vinyl benzoate, and the like; unsaturated carbonic acid glycidyl ester series compounds such as glycidyl acrylate, glycidyl methacrylate, and the like; vinyl cyanide compounds such as acrylonitrile, methacrylonitrile, and the like; and unsaturated amide series compounds such as acryl amide, methacryl amide, and the like, and combinations thereof.

In one embodiment, the pigment can be a copolymer of the following Formula 3.

[Chemical Formula 3]

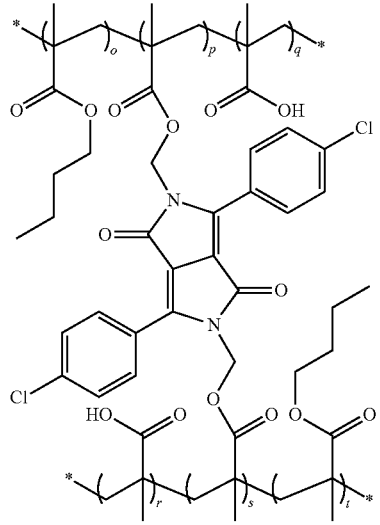

In the above formula, o is about 10 to about 50 mol %, p is about 10 to about 50 mol %, q is about 10 to about 50 mol %, r is about 10 to about 50 mol %, s is about 10 to about 50 mol %, and t is about 10 to about 50 mol %.

The composition of the invention can include the pigment in an amount of about 5 to about 30 wt % based on the total weight of the composition. When the amount of the pigment is about 5 to about 30 wt %, color is effectively realized and appropriate viscosity may be obtained, which can provide products having desired optical and physiochemical qualities.

(B) Binder Resin

The binder resin includes an acrylate-based copolymer resin obtained from monomers such as but not limited to acrylic acid, alkyl methacrylate, aryl methacrylate, alcohol methacrylate, alkylaryl methacrylate, succinicmethacrylate, styrene, N-benzyl phthalicimide, and the like, and the monomers may be used singularly or in combination.

Specific non-limiting examples of the monomers include acrylic acid, methacrylic acid, methylmethacrylate, ethylmethacrylate, propylmethacrylate, ethylhexylmethacrylate, phenylmethacrylate, acrylic acid benzylmethacrylate, benzylmethacrylate, tolyl methacrylate, o-silylmethacrylate, glycerol methacrylate, alkylaryl methacrylate, succinicmethacrylate, and the like, and the monomers may be used singularly or in combination.

The composition can include the binder resin in an amount of about 1 to about 50 wt % based on the total weight of the composition. When the amount of the binder resin is about 1 to about 50 wt %, dispersion is effectively performed, and appropriate dispersion stability and viscosity may be obtained, which can result in products having desired optical and physiochemical qualities.

(C) Photopolymerization Initiator

The photopolymerization initiator may be any suitable initiator generally known and used for a photosensitive resin composition, for example an acetophenone-based compound, a benzophenone-based compound, a thioxanthone-based compound, a benzoin-based compound, a triazine-based compound, an oxime-based compound, or a combination thereof.

Exemplary acetophenone-based compounds suitable for use in the present invention include without limitation 2,2'-diethoxyacetophenone, 2,2'-dibutoxyacetophenone, 2-hydroxy-2-methylfluorophenone, p-t-butyltrichloroacetophenone, p-t-butyldichloroacetophenone, 4-chloroacetophenone, 2,2'-dichloro-4-phenoxyacetophenone, 2-methyl-1-(4-(methylthio)phenyl)-2-morpholinopropane-1-one, 2-benzyl-2-dimethylamino-1-(4-morpholinophenyl)-butane-1-one, and the like, and combinations thereof.

Exemplary benzophenone-based compounds suitable for use in the present invention include without limitation benzophenone, benzoyl benzoate, benzoyl methyl benzoate, 4-phenyl benzophenone, hydroxy benzophenone, acrylated benzophenone, 4,4'-bis(dimethyl amino) benzophenone, 4,4'-bis(diethylamino)benzophenone, 4,4'-dimethyl aminobenzophenone, 4,4'-dichlorobenzophenone, 3,3'-dimethyl-2-methoxy benzophenone, and the like, and combinations thereof.

Exemplary thioxanthone-based compounds suitable for use in the present invention include without limitation thioxanthone, 2-methylthioxanthone, isopropyl thioxanthone, 2,4-diethyl thioxanthone, 2,4-diisopropyl thioxanthone, 2-chlorothioxanthone, and the like, and combinations thereof.

Exemplary benzoin-based compounds suitable for use in the present invention include without limitation benzoin, benzoin methyl ether, benzoin ethyl ether, benzoin isopropyl ether, benzoin isobutyl ether, benzyldimethylketal, and the like, and combinations thereof.

Exemplary triazine-based compounds suitable for use in the present invention include without limitation 2,4,6,-trichloro s-triazine, 2-phenyl 4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloro methyl)-s-triazine, 2-biphenyl 4,6-bis(trichloro methyl)-s-triazine, bis(trichloromethyl)-6-styryl s-triazine, 2-(naphto-1-yl)-4,6-bis(trichloromethyl)-s-triazine, 2-(4-methoxynaphto-1-yl)-4,6-bis(trichloromethyl)-s-triazine, 2-4-trichloromethyl (piperonyl)-6-triazine, 2-4-trichloromethyl (4'-methoxystyryl)-6-triazine, 2-piperonyl-4,6-bis (trichloromethyl)-1,3,5-triazine, and the like, and combinations thereof.

Exemplary oxime-based compounds suitable for use in the present invention include without limitation 2-(o-benzoyloxime)-1-[4-(phenylthio)phenyl]-1,2-octanedione, 1-(o-acetyloxime)-1-[9-ethyl-6-(2-methylbenzoyl)-9H-carbazole-3-yl]ethanone, and the like, and combinations thereof.

Besides the photopolymerization initiator, a carbazole-based compound, a diketone series compound, a sulfonium borate-based compound, a diazo-based compound, a biimidazole-based compound, and the like, and combinations thereof may be also used as a photopolymerization initiator.

The composition can include the photopolymerization initiator in an amount of about 0.01 to about 5 wt % based on the total weight of the composition. In one embodiment, the photopolymerization initiator may be included in an amount of about 0.05 to about 3 wt %. When the amount of the photopolymerization initiator is about 0.01 to about 5 wt %, composition sensitivity may be improved, which can result in products having excellent physical and optical characteristics.

(D) Photopolymerizable Monomer

The photopolymerizable monomer is a multi-functional monomer including at least two hydroxyl groups. Exemplary photopolymerizable monomers suitable for use in the present invention include without limitation glycerolmethacrylate, pentaerythritol hexaacrylate, ethyleneglycoldiacrylate, triethyleneglycoldiacrylate, 1,4-butanedioldiacrylate, 1,6-hexanedioldiacrylate, neopentylglycoldiacrylate, pentaerythritol diacrylate, pentaerythritol triacrylate, dipentaerythritol acrylate, bisphenol A diacrylate, trimethylolpropanetriacrylate, novolac epoxyacrylate, ethyleneglycoldimethacrylate, diethyleneglycoldimethacrylate, triethyleneglycoldimethacrylate, propyleneglycoldimethacrylate, 1,4-butanedioldimethacrylate, 1,6-hexanedioldimethacrylate, and the like, and combinations thereof.

The composition can include the photopolymerization monomer in an amount of about 1 to about 80 wt % based on the total weight of the composition. In one embodiment, the photopolymerization monomer may be included in an amount of about 5 to about 50 wt %. When the amount of the photopolymerization monomer is about 1 to about 80 wt %, a pattern after an exposure process may be maintained well, appropriate viscosity may be obtained, and residue after exposure does not remain, which can provide a desirably sized pattern and products having good optical and physiochemical characteristics.

(E) Solvent

The solvent is not specifically limited, and any suitable generally-used solvent may be used singularly or in combination as needed. Exemplary solvents suitable for use in the present invention can include without limitation alcohols such as methanol, ethanol, and the like; ethers such as dichloroethyl ether, n-butyl ether, diisoamyl ether, methylphenyl ether, tetrahydrofuran, and the like; glycol ethers such as ethylene glycol monomethylether, ethylene glycol monoethylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol methylethyl acetate, propylene glycol methylether acetate, propylene glycol propylether acetate, and the like; aromatic hydrocarbons such as toluene, xylene, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactic acid ester such as methyl lactate, ethyl lactate, and the like; oxyacetate alkyl esters such as methyl oxyacetate, ethyl oxyacetate, butyl oxyacetate, and the like; alkoxy alkyl acetate esters such as methoxy methyl acetate, methoxy ethyl acetate, methoxy butyl acetate, ethoxy methyl acetate, ethoxy ethyl acetate, and the like; 3-oxy propionic acid alkyl esters such as 3-oxy methyl propionate, 3-oxy ethyl propionate, and the like; 3-alkoxy propionic acid alkyl esters such as 3-methoxy methyl propionate, 3-methoxy ethyl propionate, 3-ethoxy ethyl propionate, 3-ethoxy methyl propionate, and the like; 2-oxy propionic acid alkyl esters such as 2-oxy methyl propionate, 2-oxy ethyl propionate, 2-oxy propyl propionate, and the like; 2-alkoxy propionic acid alkyl esters such as 2-methoxy methyl propionate, 2-methoxy ethyl propionate, 2-ethoxy ethyl propionate, 2-ethoxy methyl propionate, and the like; 2-oxy-2-methyl propionic acid esters such as 2-oxy-2-methyl methyl propionate, 2-oxy-2-methyl ethyl propionate, and the like; monooxy monocarboxylic acid alkyl esters of a 2-alkoxy-2-methyl propionic acid alkyl such as 2-methoxy-2-methyl methyl propionate, 2-ethoxy-2-methyl ethyl propionate, and the like; esters such as 2-hydroxy ethyl propionate, 2-hydroxy-2-methyl ethyl propionate, hydroxy ethyl acetate, 2-hydroxy-3-methyl methyl butanoate; or ketonic acid esters such as ethyl pyruvate, and the like; and combinations thereof.

Other exemplary solvents suitable for use in the present invention can further include N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetyl acetone, isophorone, caproic acid, caprylic acid, 1-octanol, 1-nonanol, benzylalcohol, benzyl acetate, ethyl benzoate, diethyl oxalate, diethyl maleate, γ-butyrolactone, carbonate ethylene, carbonate propylene, phenyl cellosolve acetate, and the like, and combinations thereof.

Of the above solvents, glycol ethers such as ethylene glycol monoethyl ether; cellosolve acetates such as ethyl cellosolve acetate; esters such as 2-hydroxy ethyl propionate; carbitol such as diethylene glycol monomethyl ether; and propylene glycol alkylether acetates such as propylene glycol methylether acetate, propylene glycol propylether acetate, and so on may be appropriate in terms of compatibility and reactivity.

The amount of the solvent is not limited, and it may be controlled according to amounts of the pigment, binder resin, photopolymerization initiator, and photopolymerizable monomer. In one embodiment, the solvent may be used in an amount of about 10 to about 90 wt % based on total weight of the composition, and in another embodiment, it is used in an amount of about 50 to about 80 wt % based on total weight of the composition. When the amount of the solvent is about 10 to about 90 wt %, appropriate viscosity may be obtained, thereby improving physical and optical characteristics of the resultant products.

(F) Other Additives

The photosensitive resin composition for a color filter may further include additional additives such as but not limited to malonic acid, oxalic acid, succinic acid, itaconic acid, 3-amino-1,2-propanediol, or a fluorine-based surfactant in order to prevent stains or spots upon coating, to adjust leveling, or to prevent pattern residues due to non-development. These additives may be in an appropriate amount based on the desired properties.

The photosensitive resin composition may further include an epoxy compound to improve adherence and other characteristics as needed. Exemplary epoxy compounds suitable for use in the present invention include without limitation an epoxy novolac acryl carboxylate resin, an ortho cresol novolac epoxy resin, a phenol novolac epoxy resin, a tetra methyl biphenyl epoxy resin, a bisphenol A epoxy resin, an alicyclic epoxy resin, or a combination thereof.

The composition can include the epoxy compound in an amount of about 0.01 to about 5 parts by weight based on 100 parts by weight of the photosensitive resin composition. When the amount of the epoxy compound is about 0.01 to about 5 parts by weight, storage, adherence, and other characteristics can be improved.

When the epoxy compound is included, a radical polymerization initiator such as a peroxide initiator or an azobis-based initiator may be further included.

Hereinafter, an exemplary method of preparing the photosensitive resin composition for a color filter is described. A photopolymerization initiator is dissolved and agitated in the solvent at room temperature for about 1 to about 2 hours. Then, an alkali soluble resin and a photopolymerizable monomer are added thereto and agitated at room temperature for about 1 to about 2 hours.

A pigment is added to the resulting mixture and agitated at room temperature for about 30 minutes to about 1 hour, then filtered 2 to 5 times to remove impurities. In this manner, it is possible to provide a photosensitive resin composition for a color filter according to one embodiment of the present invention.

In addition, according to another embodiment of the present invention, a color filter fabricated by using the photosensitive resin composition for a color filter prepared with the pigment dispersion composition having the above-mentioned composition is provided.

The color filter may be fabricated by a method including: coating the photosensitive resin composition on a suitable substrate or wafer for a color filter in a thickness of between about 5000 and about 8000 Å using a suitable coating process such as spin coating, slit coating, and the like; irradiating the coated photosensitive resin composition layer to obtain a required pattern for the color filter; and treating the coating layer with an alkali developing solution to dissolve a non-exposed part of the coating layer and to provide a color filter having a required pattern. The light source for the irradiation may include 356 nm I-line light, but is not limited thereto.

The process may be repeated depending upon the required number of colors of red (R), green (G), and blue (B), so as to provide a color filter having a desired pattern. During the manufacturing process, the image pattern obtained after the development step may be hardened by reheating or irradiating with an actinic ray to improve crack-resistance, solvent-resistance, and the like.

It is thereby possible to provide a color filter having a fine pixel of a micro-square pattern. The color filter fabricated using the resist composition for a color filter can have high resolution when it is used in an image sensor.

FIG. 1 is a schematic view of a complementary metal oxide semiconductor (CMOS) image sensor according to one embodiment of the present invention.

As shown in FIG. 1, a complementary metal oxide semiconductor (CMOS) image sensor 100 including the image sensor color filter according to one embodiment of the present invention includes a second overcoating layer (OCL) 3 and a color filter 5 under a microlens 1, and a first overcoating layer (OCL) 7, a passivation layer 9, and a inter-metal dielectric layer (IMD) 11 under the color filter 5. A photodiode 13 and an interlayer insulating layer 15 are disposed under the inter-metal dielectric layer 11

The following examples illustrate the present invention in more detail. However, it is understood that the present invention is not limited by these examples.

Acrylation of Diketopyrrolopyrrole (Monomerization)

Preparation Example 1

The kinds and amounts of the compounds in Preparation Example 1 are as below.

| | |
|---|---|
| C.I. red pigment 254 (Ciba Specialty Chemicals, Irgaphor Red BT-CF) | 30 g |
| Paraformaldehyde (Sigma Aldrich Company) | 5 g |
| Sulfuric acid (Daejung Chemicals and Metals Co., Ltd.) | 400 g |

Sulfuric acid is added into a reactor, then a red pigment (Irgaphor Red BT-CF) is slowly added to the reactor at room temperature while agitating, and paraformaldehyde is then added thereto. After 4 hours, the resulting reaction solution is put into a reactor including 1 kg of ice pieces, and then agitated.

The reaction solution is cooled to room temperature, filtered, washed to neutralize, and then dried to prepare the product of the following Formula 4.

[Chemical Formula 4]

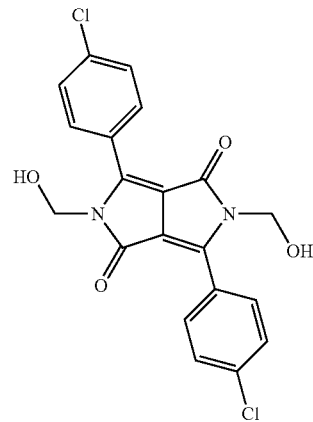

Preparation Example 2

The kinds and amounts of the compounds in Preparation Example 2 are as below.

| | |
|---|---|
| Compound of the above Formula 4 | 12 g |
| Methacrylic anhydride (Sigma Aldrich Company) | 10 g |
| Triethylamine (Sigma Aldrich Company) | 7 g |
| Tetrahydrofuran (Sigma Aldrich Company) | 400 g |

Tetrahydrofuran, methacrylic anhydride, and a compound of the above Formula 4 are put into a reactor at room temperature while injecting $N_2$, and then triethylamine is added thereto in a dropwise fashion for 30 minutes at room temperature while agitating. Then the reactor is maintained for 4 hours.

The resulting reaction solution is added in a dropwise fashion to 1 L water to obtain crystals. Then filtering and drying are performed to obtain a product of the following Formula 5.

[Chemical Formula 5]

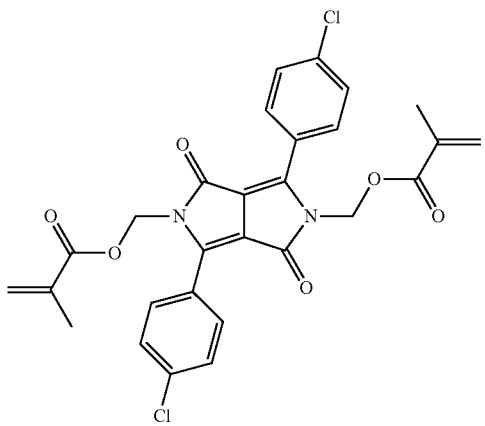

Preparation Example 3

The kinds and amounts of the compounds in Preparation Example 3 are as below.

| | |
|---|---|
| Compound of the above Formula 5 | 10 g |
| Methacrylic acid (Jusei Chemical Co.) | 1 g |
| n-butyl methacrylate (Sigma Aldrich Company) | 3 g |
| Radical initiator (Wako Co., Ltd., V601) | 0.1 g |
| Propyleneglycol methylethylacetate (Sigma Aldrich Company) | 50 g |

Propyleneglycol methylethylacetate and a radical initiator are put into a reactor at room temperature while injecting $N_2$, and then the temperature is increased to 80° C. A mixture of the compound of Formula 5, methacrylic acid, and n-butyl methacrylate are added to the reactor for 1 hour, and then maintained for 2 hours. The resulting reaction solution is cooled to room temperature to obtain a polymer of the following Formula 3.

[Chemical Formula 3]

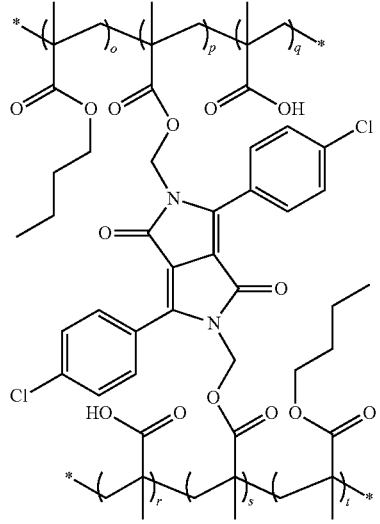

In the above formula, o is 45 mol %, p is 35 mol %, q is 20 mol %, r is 20 mol %, s is 35 mol %, and t is 45 mol %.

Fabrication of Photosensitive Resin Composition for a Color Filter

Example 1

A photosensitive resin composition for a color filter is prepared by agitating the following composition including the pigment of Chemical Formula 3 prepared according to Preparation Example 3 for 1 hour with a formulator.

| | |
|---|---|
| Pigment of Chemical Formula 3 according to Preparation Example 3 | 20 wt % |
| Acrylic acid benzylmethacrylate copolymer (Miwon Commercial Co., Ltd., NPR8000) | 1 wt % |
| Photopolymerizable monomer (Dongyang SYN Co., Ltd., dipentaerythrytol hexaacrylate (DPHA)) | 3 wt % |
| Propyleneglycol methylethylacetate | 75.5 wt % |
| Triazine-based photopolymerization initiator (Nippon Kayaku Co., Ltd., TPP) | 0.5 wt % |

The triazine-based photopolymerization initiator is dissolved in propyleneglycol methylethylacetate and then the resultant is agitated for 30 minutes at room temperature. The acrylic acid benzylmethacrylate copolymer binder and photopolymerizable monomer are added to the mixture and then agitated for 30 minutes at room temperature. The compound of the above Formula 3 is added to the mixture and then agitated for 1 hour at room temperature. Then filtering is performed once to prepare a photosensitive resin composition for a color filter.

COMPARATIVE EXAMPLE 1

A photosensitive resin composition is prepared in accordance with the same procedure as in Example 1, except that 20 wt % C.I. red pigment 254 (Produced by Ciba Specialty Chemicals, Irgaphor Red BT-CF) is used.

Scanning Electron Microscope (SEM) Analysis of Color Filter Pattern

Each photosensitive resin composition for a color filter obtained from Example 1 and Comparative Example 1 is coated on a silicon wafer (LG Siltron) at a thickness of 0.8 μm with a spin coater (KDNS, K-Spin8) and exposed for 350 ms with an exposer (Nikon, I10C).

Then development with a developing solution (TMAH 0.2%) is performed to provide a pattern. After that, the patterns are tested for resolution and pattern residues with a CD SEM analyzer (KLA-Tencor, 8100XP). The results are shown in FIGS. 2 and 3.

Figure 2:
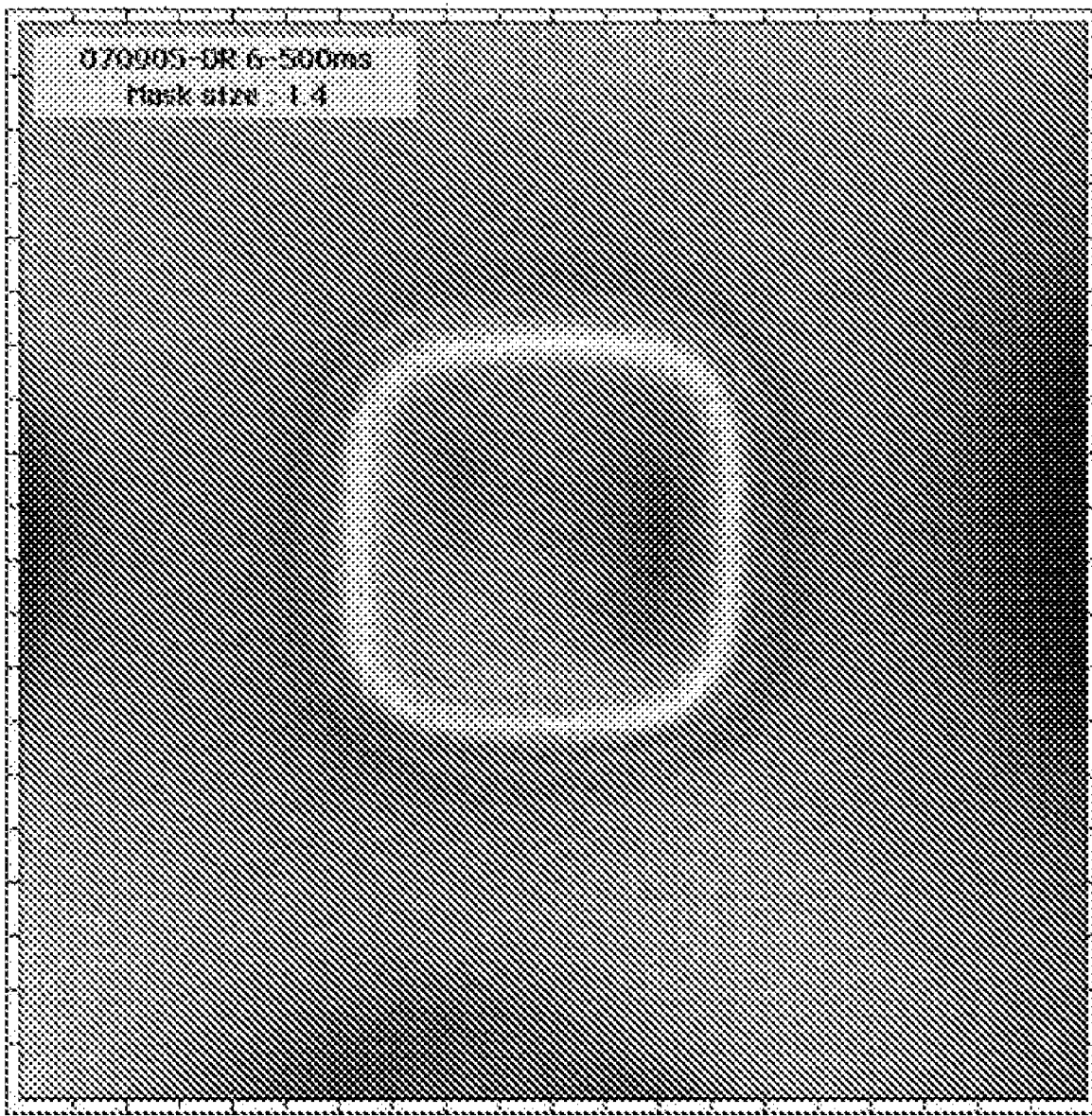
FIG. 2 is a SEM (scanning electron microscope) photograph of a pattern fabricated using the photosensitive resin composition for a color filter according to Example 1.
Figure 3:
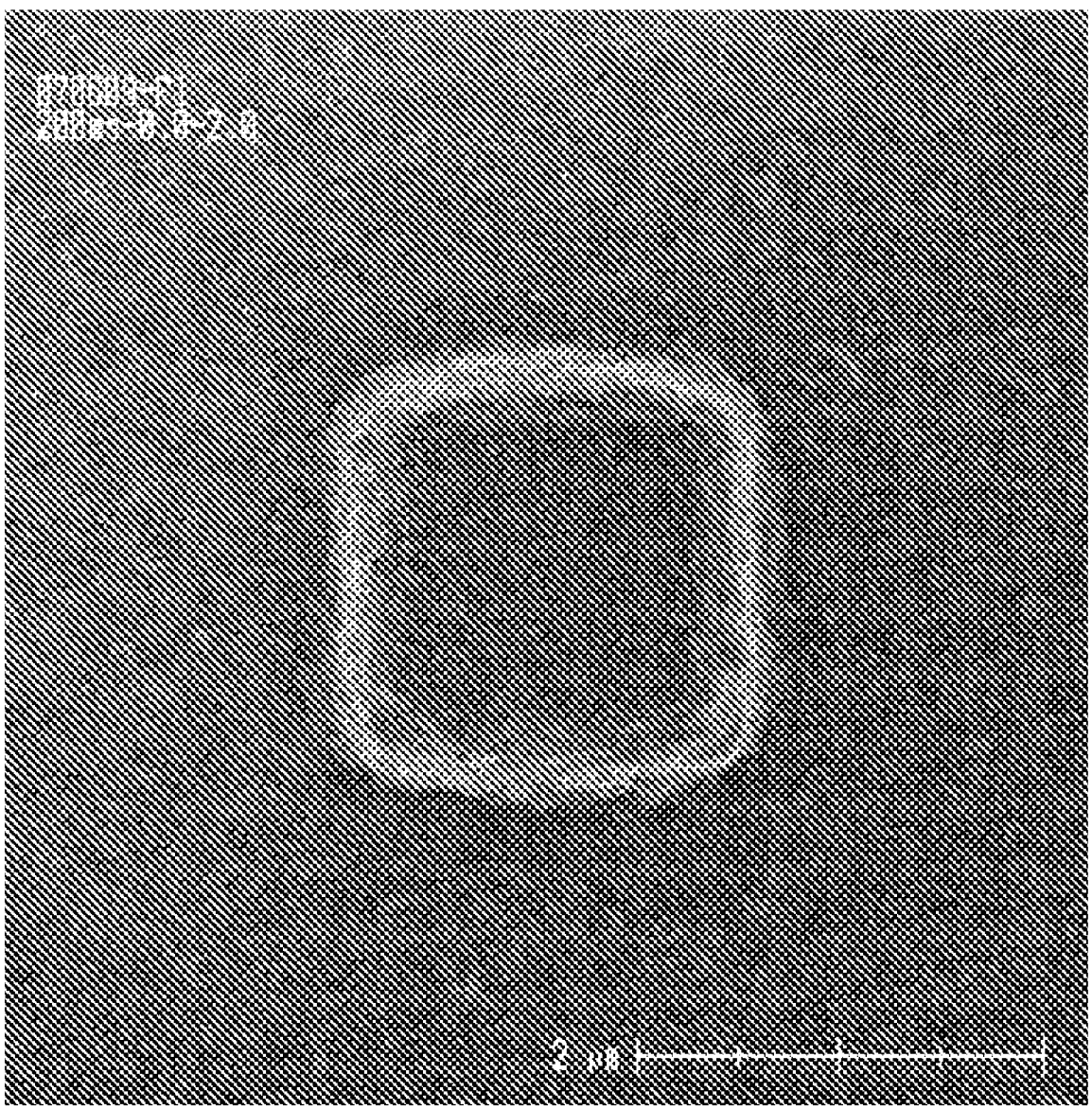
FIG. 3 is a SEM photograph of a pattern fabricated using the photosensitive resin composition for a color filter according to Comparative Example 1.

FIG. 2 (Example 1) and FIG. 3 (Comparative Example 1) show resolutions of patterns of 1.4 μm, respectively. As shown in FIGS. 2 and 3, for the photosensitive resin composition for a color filter according to Example 1, the developed pattern had a higher square resolution than Comparative Example 1. Furthermore, few pattern residues exist in the photosensitive resin composition for a color filter according to Example 1, while more pattern residues exist in the photosensitive resin composition for a color filter according to Comparative Example 1.

These results demonstrate that the photosensitive resin composition improves the resolution and decreases the pattern residues during the patterning process.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A photosensitive resin composition for a color filter, comprising
   (A) a pigment;
   (B) a binder resin;
   (C) a photopolymerization initiator;
   (D) a photopolymerizable monomer; and
   (E) a solvent,
   wherein the pigment has a structure of the following Formula 3:

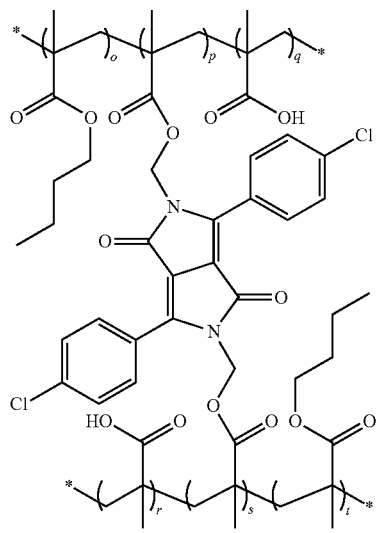

[Chemical Formula 3]

wherein, in Chemical Formula 3, o is about 10 to about 50 mol %, p is 35 to about 50 mol %, q is about 10 to about 50 mol %, r is about 10 to about 50 mol %, s is about 10 to about 50 mol %, and t is about 10 to about 50 mol %, and the pigment has a weight average molecular weight of about 2000 to about 40,000.

2. The photosensitive resin composition of claim 1, wherein the composition comprises:
   (A) the pigment in an amount of about 5 to about 30 wt %;
   (B) the binder resin in an amount of about 1 to about 50 wt %;
   (C) the photopolymerization initiator in an amount of about 0.01 to about 5 wt %;
   (D) the photopolymerizable monomer in an amount of about 1 to about 80 wt %; and
   (E) the balance solvent.

3. The photosensitive resin composition of claim 1, wherein, in Chemical Formula 3, s is 35 to about 50 mol %.

4. A color filter fabricated using a photosensitive resin, comprising
   (A) a pigment;
   (B) a binder resin;
   (C) a photopolymerization initiator;
   (D) a photopolymerizable monomer; and
   (E) a solvent,
   wherein the pigment has a structure of the following Formula 3:

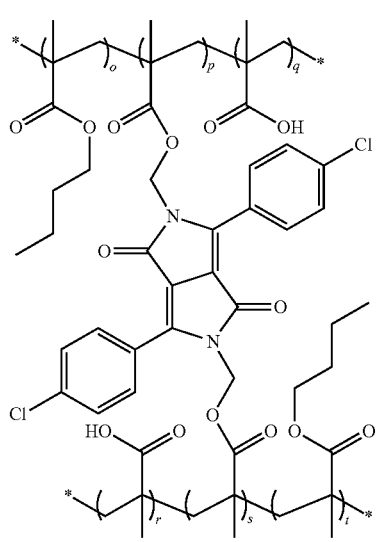

[Chemical Formula 3]

wherein, in Chemical Formula 3, o is about 10 to about 50 mol %, p is 35 to about 50 mol %, q is about 10 to about 50 mol %, r is about 10 to about 50 mol %, s is about 10 to about 50 mol %, and t is about 10 to about 50 mol %, and the pigment has a weight average molecular weight of about 2000 to about 40,000.

5. The color filter of claim 4, wherein the composition comprises
   (A) the pigment in an amount of about 5 to about 30 wt %;
   (B) the binder resin in an amount of about 1 to about 50 wt %;
   (C) the photopolymerization initiator in an amount of about 0.01 to about 5 wt %;
   (D) the photopolymerizable monomer in an amount of about 1 to about 80 wt %; and
   (E) the balance solvent.

6. An image sensor comprising a color filter of claim 4.

7. The color filter of claim 4, wherein, in Chemical Formula 3, s is 35 to about 50 mol %.

* * * * *